(12) United States Patent
Rhodes

(10) Patent No.: US 6,343,120 B1
(45) Date of Patent: *Jan. 29, 2002

(54) METHOD AND APPARATUS FOR PROVIDING A CALLER ID ALIAS

(75) Inventor: Jeffrey Rhodes, Redmond, WA (US)

(73) Assignee: AT&T Wireless Services, Inc., Redmond, WA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/728,293

(22) Filed: Oct. 8, 1996

(51) Int. Cl.$^7$ .................................................. H04M 1/56
(52) U.S. Cl. ..................... 379/142; 379/127; 379/93.23; 455/415
(58) Field of Search ........................... 379/142, 67, 201, 379/229, 230, 127, 93.23, 93.17, 88.19, 88.2, 88.21, 129; 455/415, 414

(56) References Cited

U.S. PATENT DOCUMENTS

| 5,033,076 A | * | 7/1991 | Jones et al. ..................... 379/67 |
| 5,161,181 A | | 11/1992 | Zwick |
| 5,163,087 A | * | 11/1992 | Kaplan ........................ 379/142 |
| 5,259,026 A | | 11/1993 | Johnson ....................... 379/207 |
| 5,274,699 A | | 12/1993 | Ranz ........................... 379/142 |
| 5,278,894 A | * | 1/1994 | Shaw ........................... 379/142 |
| 5,282,243 A | * | 1/1994 | Dabbaghi et al. ............ 379/201 |
| 5,283,824 A | * | 2/1994 | Shaw ........................... 379/142 |
| 5,479,494 A | * | 12/1995 | Clitherow .................... 379/144 |
| 5,533,100 A | * | 7/1996 | Bass et al. ................... 379/209 |
| 5,590,184 A | * | 12/1996 | London ....................... 379/142 |
| 5,661,781 A | * | 8/1997 | DeJager ....................... 379/144 |
| 5,864,612 A | * | 1/1999 | Strauss et al. ............... 379/142 |
| 5,901,209 A | * | 5/1999 | Tannenbaum et al. ...... 379/144 |

OTHER PUBLICATIONS

*LSSGR LATA Switching Systems Generic Requirements, CLASS$^{SM}$ Feature: Calling Name Delivery Generic Requirements,* FSD 01–02–1070, Technical Reference TR–NWT–001188, Issue 1, Dec. 1991, pps. i–96.

* cited by examiner

*Primary Examiner*—Curtis A. Kuntz
*Assistant Examiner*—Rexford N Barnie
(74) *Attorney, Agent, or Firm*—Kenyon & Kenyon

(57) ABSTRACT

A method and apparatus provide the capability of presenting alias information in place of public name information to support caller ID services. A calling party name database is modified to include alias information. The terminating local exchange carrier queries the network for calling party information. The appropriate information field within the database is accessed based on an indication of whether the calling party is selecting the public name or the alias information to be provided to the called party.

4 Claims, 3 Drawing Sheets

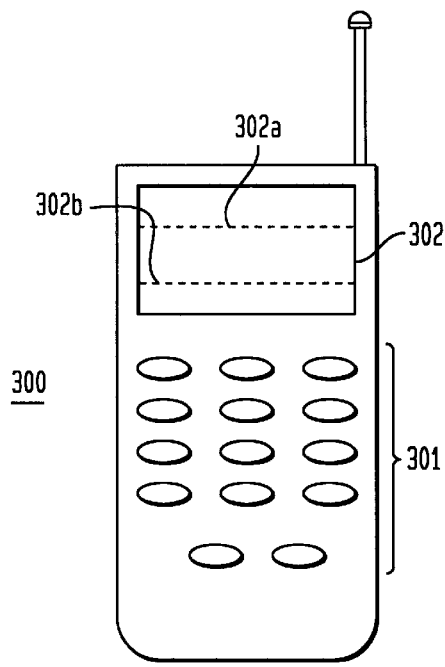

METHOD AND APPARATUS FOR PROVIDING A CALLER ID ALIAS

FIELD OF THE INVENTION

The present invention is directed to a method and apparatus for providing alias information to be associated with identification information that corresponds to a calling party (a caller ID). More specifically, the present invention is directed to providing separate alias information to be associated with a calling party number in a database where the calling party can designate the identification information that is to be provided when a query searches for the caller ID.

BACKGROUND OF THE INVENTION

It is well known how to provide a service referred to as calling party ID in telecommunication systems. The function of this service is to permit the called party to receive information that identifies the calling party without need for answering the call. This feature has had great usefulness in such environments as emergency services where an emergency response team is the called party and it receives information identifying the calling party and that information can be cross-referenced to other database information that identifies the location of the calling party. The usefulness of this functionality has also increased in the telecommunication consumer market as many subscribers are interested in screening phone calls to determine whether the calling party is one with whom the called party wishes to speak at any given time.

An example of a known configuration for implementing the caller ID function is shown in FIG. 1. For the purposes of this example, it is presumed that the caller at telephone 102 wishes to make a connection to the party at telephone 113. It is further presumed that the party at telephone 113 has subscribed to a caller ID service. Thus, the subscriber at telephone 113 will be provided with calling party identification information for each telephone call which is directed to that telephone. When the party at telephone 102 initiates the call through its originating switch 100 and the call is routed through a network, represented by line 140 and data line 141, to terminating LEC switch 110, the terminating switch recognizes that the call is directed to the subscriber at telephone 113. The switch also recognizes that the subscriber at telephone 113 has the calling party ID functionality. Therefore, the terminating switch sends a query to a name database 120 along data line 115. The name database will send back a public name that is associated with the calling party. Typically this public name is the billing name for the subscriber at telephone 102. The calling party number and the name accessed from the name database 120 are then transferred from the terminating switch to the telephone 113 and displayed for review by the subscriber at telephone 113 or in an adjacent device provided to effect the service. The subscriber can then make a decision as to whether to answer the telephone call, have an answering machine answer, or allow the phone call to go unanswered.

The calling party ID functionality recognizes that a number of parties in the system may have what are commonly referred to as unlisted phone numbers or have asked that their calling party name be maintained as private. In those circumstances, when the terminating switch requests caller ID information from the name database, the name database will provide information back to the terminating switch indicating that the number is unlisted or that the calling party is of a permanent privacy status. The terminating switch will not provide the called party with a name but with an indication of name unavailability, e.g., "anonymous" or "unknown".

It is also well known how to permit the calling party to select, on a per call basis, whether to block access to the name information in the database for a normally available caller ID or to permit access to the name database even though the calling party is normally in the permanent private status. This can be accomplished by having the calling party enter a specific code on the telephone keypad, e.g., *69 or *82, and have that code associated with the telephone call as it is routed through the network. When the terminating switch receives the code, for instance a code which indicates that access to the name database is blocked (*69), the terminating switch will not even attempt a query to the database but instead will provide the "private" or "anonymous" information to the called party. Alternatively, if the calling party opts to permit the transmission of information for this call only, then the calling party enters a special "presentation allowed" code indicative of that fact (*82). The terminating switch provides the "presentation allowed" code to the centralized name database to indicate that the name database should provide the calling party identification information despite the normal private status of that information in the database.

In the cellular communication environment, mobile stations or phones that have a display could also take advantage of the calling party number function. Stations referred to as IS-136 terminals have such a display. In the mobile environment, an example of which is shown in FIG. 2, a calling party 200 seeks to establish a communication with mobile station 209. In this example, the call is initiated through a Private Branch Exchange (PBX) 201 to a Local Exchange Carrier (LEC) 202. The call is routed to an Inter-Exchange Carrier (IXC) 204 through a long distance network to another IXC 205. The call is then routed to the appropriate LEC 206 and on to a Mobile Switching Center (MSC) 207. Alternatively, the call could be routed directly from the IXC to the MSC, bypassing the LEC. The terminating MSC analyzes the Calling Party Number (CPN) that is received and the information transmitted with that CPN to determine whether that number is one that can be displayed, i.e., whether the number is a private number. This is typically indicated by a code number such as "00" or "01" associated with the CPN. If the CPN is not a private number (code "00") then the terminating MSC sends a query back through data line 215, LEC 202 and dataline 211 to the subscriber database 203 that is associated with LEC 202. The calling party number is used to access the public name of the calling party and that public name is transmitted through the network to the terminating MSC 207 and associated with the CPN. Then the CPN and calling party name are transmitted to the mobile station 209 for display at base staion 208. The public name for an unlisted number can be suppressed such that only the calling number is presented to mobile station 209. An example of a display for such a mobile station is provided in FIG. 3. The station 300 has a keypad 301 and a display 302. The display has at least two display-lines 302a and 302b. The mobile station will display the calling party number on one line such as line 302a and the calling party ID that is accessed from the database on the other line, such as 302b.

If the terminating MSC instead receives the CPN and a code denoting that the calling party number is private, e.g., "01", then the terminating MSC does not send any query back through the network and instead merely provides information to the mobile station to display either "anonymous" or "private" without displaying the telephone number.

When the terminating MSC does not receive the calling party number, the mobile station displays "VOID" or "Unavailable".

The existing calling party ID configurations limit the information which can be transmitted by the calling party to the called party. It is difficult for a calling party to tailor information for identifying the calling party to a given called party because the access to calling party information and the amount of information associated with the calling party is limited.

SUMMARY OF THE INVENTION

The present invention provides a capability for calling parties to provide alias information to a called party in lieu of merely identifying the calling party by some expression such as private or anonymous.

In accordance with the present invention, a calling party ID database can store multiple fields of calling party information for each calling number. For example, a first identification field associated with a calling number can be designated as a public name field which is to be provided in those circumstances where the calling party is not availing themselves of any private status or alias functionality. A second identification field may be associated with the calling party number and that second field can store calling party customized information. That information can take the form of an alias identification of the calling party, such as a nick-name or alternative name, or it can contain other message information such as an alternative telephone number for call back. A terminating LEC or MSC would send a query back for all received phone calls whether the received calling party number was associated with a status indicator that identified the call as a public status call or a private status call. The query would then access the appropriate identification field in the database using the status indicator associated with the calling party number. For example, if the status indicator shows that the calling party should receive the public name then the public name field is accessed. If, however, the status code indicates that the calling party has designated a private status, then the alias information field can be accessed by the query and provided to the terminating LEC or MSC.

In an alternative configuration, the present invention provides two calling party ID databases: one directed to private information and the other directed to public name information.

BRIEF DESCRIPTION OF THE DRAWINGS

FIG. 3 provides a diagram illustrating display capabilities of a mobile station in the cellular environment of FIG. 2.

FIGS. 4A and 4B illustrate database arrangements for implementing an embodiment of the present invention.

DETAILED DESCRIPTION

Figure 1:
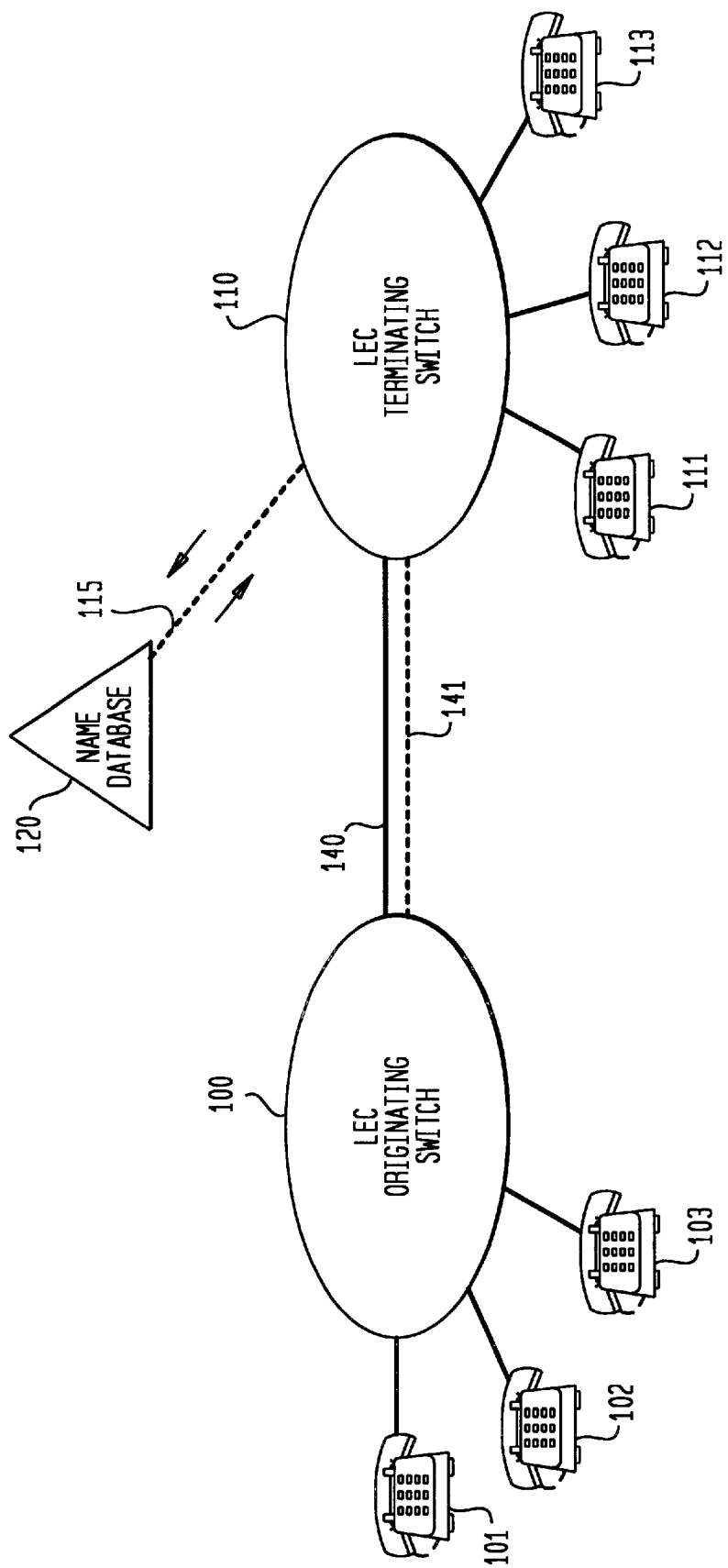
FIG. 1 illustrates a known configuration for providing calling party identification service.
Figure 2:
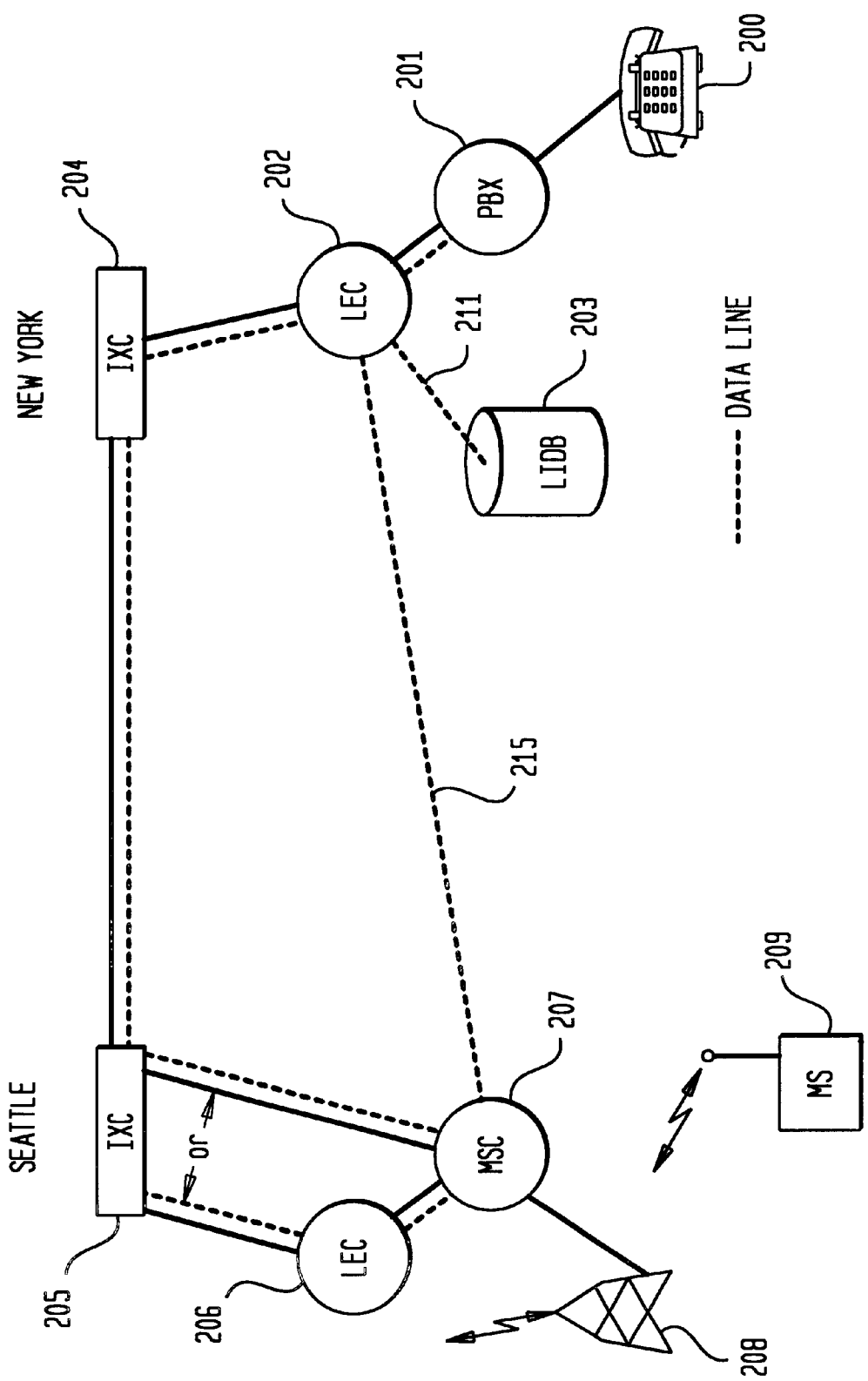
FIG. 2 illustrates a known configuration for providing calling party identification information in a cellular environment.

As described in the known configuration, especially in the cellular environment, a terminating LEC or MSC receives an indicator with a Calling Party Number (CPN) and that indicator identifies which information, if any, shall be displayed on the mobile station display. For example, a "00" indicator that is sent all the way to the Mobile Switching Center (MSC) means that if calling party ID is to be implemented the public name of the called party is accessible. The indicator prompts the MSC to send a query all the way back to the information database associated with the calling party. The query includes the CPN. This information is used to examine the subscriber database to obtain the public calling party name information from the database and transfers it to the terminating LEC or MSC where it is associated with the calling party number. The calling party number and public name information are then transferred to the mobile station and displayed at that station.

Under those circumstances where the calling party has a "private" status, the indicator associated with the CPN may be "01". Upon receipt of this indicator the MSC or LEC of the prior art does not send any query back through the network and the only identification information passed on to the mobile station is "private" or "anonymous".

In accordance with the present invention the MSC will always send a query back to the information database associated with the calling party. That is, whether the status indicator is "00", or "00", the MSC will send a status inquiry back that includes both the CPN and the status indicator. These two pieces of information are then used to determine which identification information is to be supplied by the information database associated with the calling party.

As an example, in FIG. 4A the information database may include a plurality of identification information fields for each calling number. The database 400 may have a first field that identifies the calling numbers 401. Then for each calling number there can be multiple identification fields. One such identification field is the Public Name Field 402. A second such identification field is the Alias Information field 403. If the status indicator which is included in the query is "00", indicating that the public name is to be used, then the identification information from the Public Name field 402 is accessed and transmitted to the terminating LEC through the network. If, on the other hand, the indicator received at the database in the query is "01" to indicate that the private or other information should be transmitted, the Alias Information field 403 corresponding to that status indicator is accessed and the information contained in that field is transmitted as the identification information.

For example, in the database shown in FIG. 4A, for the calling number (908) XXX–XXXX there are two identification fields shown. In the Public Name field, the caller with that number is identified as J. Johnson. The second identification field associated with the caller, the Alias Information field, contains the identification information "Sonny". Thus, if this calling number originates a phone call to the mobile station and the "00" indicator is associated with the CPN, then upon receipt of a query the database will provide the information J. Johnson to the MSC and both the CPN and the public name will be displayed on the target mobile station display. If the CPN was transmitted with the status indicator "01" then the query for identification information will result in an access of alias information such that the information "Sonny" will be transmitted to the terminating MSC and only that alias information will be transferred to the mobile station.

Of course, the information stored in the alias information field need not be limited to name information. Instead, it is possible that the calling party will provide message information, for example, a doctor may call a patient from home while on-call, but desire to have the patient return the call to the doctor's office. In such a circumstance, the Alias Information field for the doctor in the database could be populated with the alternative phone number. Then, the call would go forward with the private status indicator "01" such that a resultant query will access the alias information, that is, the alternative phone number. This alternative phone number will then be transmitted through the network to the mobile station and only that number will be displayed at the mobile station.

This arrangement provides the calling party with a tremendous amount of flexibility in identifying themselves to different called parties. By selecting the appropriate privacy status, namely public or private, with the appropriate indicator such as "00" or "01" the calling party can pre-define which identification field in the identification database is to be the source of identification information. Thus, the calling party can select whether the called party receives the public name or some alias information.

It is possible to modify the present invention so that the identification information database includes multiple identification fields for each calling party number. Under those circumstances the calling party would be able to choose between more than simply one alias information field and one public name field. Instead, it is conceivable that the calling party could create two or more customized aliases or messages and then designate which of those messages should be displayed to the called party by sending the appropriate privacy status indicator with the CPN, (e.g., "02", "03", etc.). Or a feature code *XY could be dialed to alternate between an alias and an alternative number of between two aliases or two alternative numbers for privacy status 01.

In an alternative configuration illustrated in FIG. 4B, separate databases are provided for the various identification information that is associated with a given calling party number. For instance, in database 410, only public names are associated with calling numbers. A second database 420 lists the same calling numbers but with alias information for each calling number. Thus, the privacy status indicator that is included in the query from the terminating LEC would then be used to select the appropriate database for accessing identification information. Once the database is selected, the calling party number would then be used to identify the identification information to be transmitted to the terminating LEC.

In accordance with the present invention, calling parties will be provided with flexibility in identifying themselves or selecting from among different identifications or messages to be transmitted to a party for whom calling party identification number is displayed. This will allow calling parties to customize their identifications to meet needs as they arise for different callers at different times.

The present invention is not limited in its applicability to the cellular environment although an embodiment of the invention has been described in that environment. It is also applicable to other telephone networks where calling party identification information can be transferred to the called party.

What is claimed is:

1. A method of operating a telecommunication network service to provide selected subscriber identification information to a called party, comprising:

receiving a request to identify a subscriber from a terminating access switch, the request including a subscriber number and an identification selection parameter;

selecting subscriber identification information from a database based on said subscriber number and said identification selection parameter;

constructing a message using said selected subscriber identification information; and sending said message to the terminating access switch, wherein said subscriber identification information is associated with said subscriber number in said database, and said subscriber identification information includes a subscriber name and at least one alternative subscriber identifier predetermined by the subscriber.

2. The method of claim 1 wherein said message includes an alternative subscriber identifier.

3. The method of claim 2 wherein said alternative subscriber identifier includes a number other than said subscriber number.

4. The method of claim 2 wherein said alternative subscriber identifier includes a subscriber alias.

* * * * *